June 6, 1967  L. J. KNEPPER  3,323,294
MOWER CUTTERBAR LOCK
Filed May 5, 1964
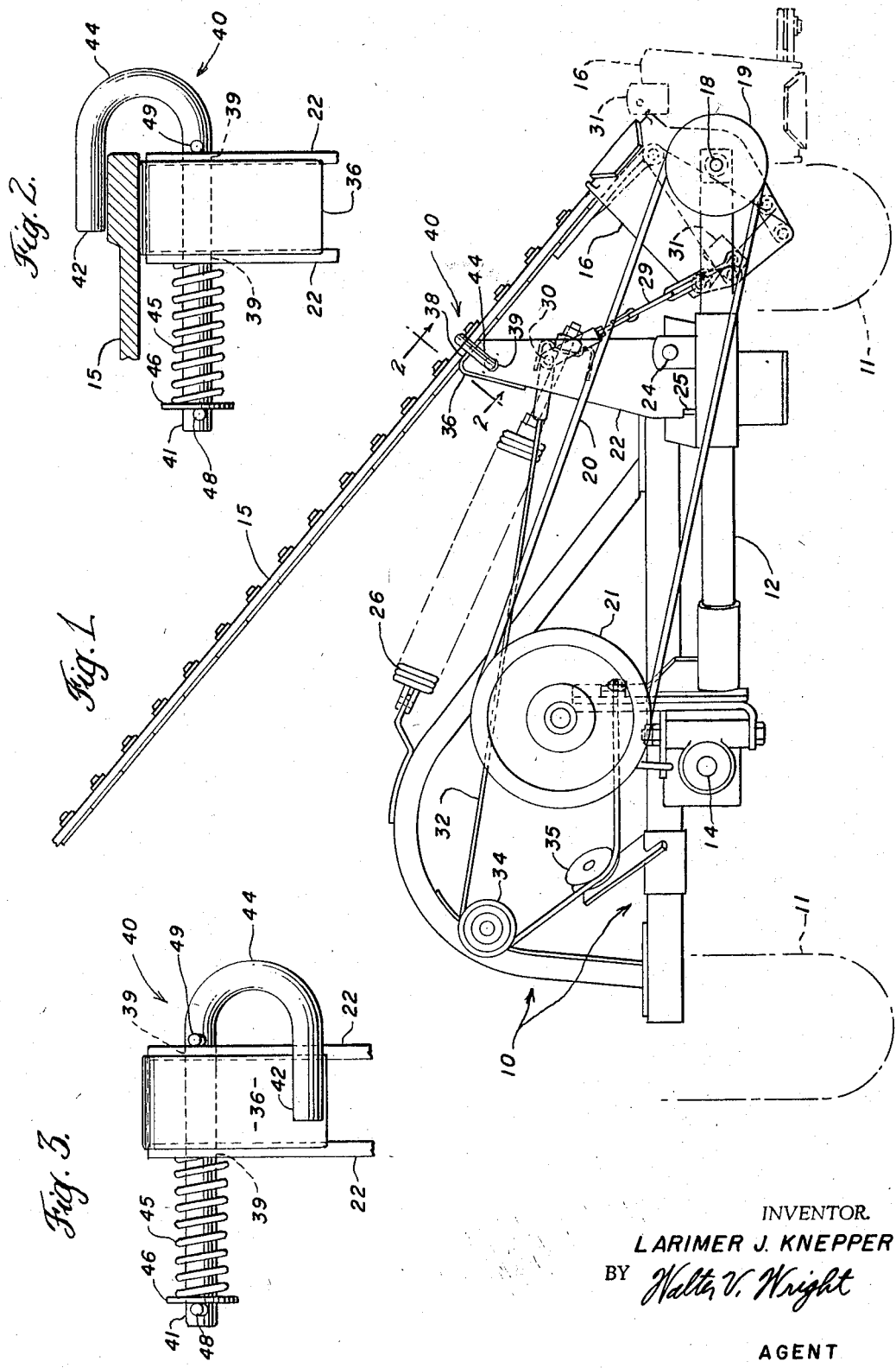
INVENTOR.
LARIMER J. KNEPPER
BY Walter V. Wright
AGENT

United States Patent Office 3,323,294
Patented June 6, 1967

3,323,294
MOWER CUTTERBAR LOCK
Larimer J. Knepper, New Holland, Pa., assignor to Sperry Rand Corporation, New Holland, Pa., a corporation of Delaware
Filed May 5, 1964, Ser. No. 365,068
1 Claim. (Cl. 56—25)

This invention relates to mowers of the cutterbar type.

Mower cutterbars are generally mounted for vertical swinging movement between two extreme positions: an operative, or mowing position wherein the cutterbar extends full length laterally from its mounting frame, and a transport position wherein the cutterbar is folded back over the frame to reduce the overall width of the implement to dimensions suitable for transport over the highways, through narrow gates, and so forth. The cutterbar assembly is fairly heavy, resilient and, because of the sharp knife members and pointed knife guards, extremely dangerous.

It is recognized in the art that it is desirable, if not essential, to fixedly lock the cutterbar in transport position. If it is not locked in transport position, the cutterbar may be bounced back to operative position during transport. This can be very hazardous in addition to subjecting mower components to extreme stresses. Early solutions to this problem were in the form of latch mechanism located at or near the pivotal mounting point of the cutterbar to hold the cutterbar in a generally vertical transport position. With the length and weight of present day cutterbar assemblies, this solution is no longer practical. The current popular practice is to pivotally mount a brace rod on the mower frame. The brace rod has a threaded end which can be passed through a hole in the cutterbar and receive a nut or other threaded fastener to fasten the cutterbar in transport position. This solution involves the problems of the cost of the brace rod, what to do with the long brace rod when the mower is operating, keeping track of the threaded fastener, and the need for simultaneous manipulation of the brace rod and the cutterbar when it is desired to fix the cutterbar in transport position.

It is an object of this invention to provide novel mechanism for latching and supporting a mower cutterbar in transport position.

It is another object of this invention to provide mower cutterbar support and latching mechanism which is low in cost and has no removable, or loose, parts.

It is another object of this invention to provide mower cutterbar latching mechanism which is quick acting and operable with one hand.

It is another object of this invention to provide mechanism to support and latch a mower cutterbar in an over-center transport position wherein the cutterbar is self steadying during latching and unlatching operations.

It is another object of this invention to provide mower cutterbar support mechanism which eliminates separate support rods and utilizes existing elements of the mower mechanism.

These and other objects and advantages of this invention will be apparent upon reference to the following description and claim taken in conjunction with the accompanying drawing wherein:

FIG. 1 is an elevational view of a mower showing the cutterbar supported and latched in transport position by mechanism constructed in accordance with the principles of the present invention;

FIG. 2 is an enlarged detailed view of the latch taken on the line 2—2 of FIG. 1; and FIG. 3 is a view similar to FIG. 2 but showing the latch member in an inactive position.

Referring now to the drawing in detail, the reference numeral 10 indicates, generally, a mower base frame. The frame is adapted to travel forwardly over the ground in any one of a number of conventional ways. For example, the frame may be provided with wheels and towed behind a tractor; or it may be mounted on a three point hitch, or other conventional linkage, and be carried by a tractor. In FIG. 1, the reference numerals 11 exemplify the traction wheels of a tractor upon which the frame 10 may be mounted. A drag bar 12 is carried by frame 10 and mounted for vertical swinging movement about a fore-and-aft extending horizontal pivot member 14 at its inboard end. The other end of drag bar 12 extends laterally beyond frame 10 and carries a conventional cutterbar 15 having a driving head 16. The cutterbar and driving head are connected to drag bar 12 by a fore-and-aft extending horizontal pivot member 18 for vertical swinging movement between a laterally extending generally horizontal operative position, shown in phantom lines in FIG. 1, and an upwardly and inwardly inclined transport position, shown in solid lines in FIG. 1.

The cutterbar is driven by a pulley 19 on the driving head and an endless belt 20 which is entrained about a large pulley 21 journalled on frame 10 and drivingly connected to the power-take-off mechanism of the tractor. An upstanding member 22, sometimes known as a gag post, is carried by drag bar 12 and extends upwardly therefrom. In the embodiment shown the gag post is made of two identical spaced apart plates which act as a single unit. The numeral 22 is applied to both plates which together constitute the gag post. The upstanding member 22 is mounted for limited rocking movement about a pivot member 24 toward and away from the outboard end of drag bar 12. As seen in FIG. 1, the upstanding member 22 is in its most counterclockwise position. Further counterclockwise movement of member 22 about pivot 24 is prevented by a stop member 25 on the drag bar.

A counterbalancing spring 26 has one end anchored to frame 10 and the other end anchored on upstanding member, or gag post, 22. This spring counterbalances the weight of the drag bar, the cutterbar and the driving head when the cutterbar is in the operative position indicated in phantom lines in FIG. 1. A short chain, or other equivalent linkage, 29, is pivoted to the upstanding member 22 at 30 and has its other end pivotally connected to a lug 31 on the mower driving head thereby transferring the counterbalancing force of spring 26 to the cutterbar. A cable 32, or other flexible member, has one end connected at 30 to gag post 22. Cable 32 extends over a system of pulleys 34 and 35 and has its other end connected to a lever, or to the tractor hitch linkage, or to some other mechanism which can be operated to exert tension on the cable.

The above mechanism is more or less conventional. Its operation will be readily understood by those familiar with the mower art. When the cutterbar is in the operative position indicated in phantom lines in FIG. 1, its weight is counterbalanced by spring 26 acting through gag post 22 and linkage 29. This enables the cutterbar to float over uneven ground in a substantially weightless state. The gag post 22 will normally be slightly clockwise about pivot member 24 from the position shown in FIG. 1. Whenever tension is exerted on the cable 32 the gag post 22 first rocks counterclockwise into engagement with stop member 25. This acts through linkage 29 to cause the cutterbar to quickly swing upwardly counterclockwise about horizontal pivot 18 to an angle of approximately ten or fifteen degrees with the ground. This constitutes an inoperative position of cutterbar 15. This manipulation of the cutterbar is commonly known as "gaging." Any further tension on cable 32 causes the entire drag bar 12 to pivot counterclockwise about horizontal pivot 14. The drag bar 12 is shown in this slightly raised position in FIG. 1.

When it is desired to transport the mower from one field to another, the cutterbar 15 may be manually swung counterclockwise about pivot member 18 to an overcenter transport position shown in solid lines in FIG. 1 wherein the cutterbar rests on and is supported by gag post 22.

A plate 36 is welded, or otherwise fixedly attached to the top portion of upstanding member 22. The configuration of plate 36 and the top portion of gag post 22 is such that a downwardly and outwardly inclined surface 38 is provided atop upstanding member 22. Surface 38 is angled downwardly so as to be parallel to cutterbar 15 when the cutterbar is in transport position. As may be seen in both FIGS. 1 and 2 the cutterbar 15 rests flatly upon surface 38 of gag post 22 when the cutterbar is in transport position. Gag post 22 has an aperture formed therein at 39. A J-shaped member 40 has a long arm 41, a short arm 42 and an innerconnecting arcuate bite portion 44. The longer arm 41 of J-shaped member 40 extends through the apertures at 39 in gag post 22 and projects beyond the side of the gag post opposite the bite portion 44 of the J-shaped member as may be seen in FIGS. 2 and 3. A coil spring 45 is carried by the projecting end of long arm 41. One end of spring 45 abuts gag post 22 while the other end abuts a washer 46 carried by arm 41. Washer 46 is locked to arm 41 by a pin 48. Another stop, or pin, 49 is provided in long arm 41 of J-shaped member 40 where the long arm 41 begins to curve into bite portion 44. It will be apparent from FIG. 2 that spring 45 biases J-shaped latch member 40 to the left as it is shown in FIGS. 2 and 3. The stop pin 49 limits leftward movement of member 40 to the extent that there will always be room for the operator to readily hook a finger through the bite portion 44 of the J-shaped member. The shorter arm 42 of the latch member overlies cutterbar 15 when it is in transport position against surface 38 of gag post 22. This latches cutterbar 15 positively in transport position. When the operator moves the J-shaped member 40 to the right as seen in FIG. 2 in opposition to the spring 45, the shorter arm 42 moves clear of cutterbar 15. The member 40 may then be rotated to move arm 42 under cutterbar 15 to the position shown in FIG. 3. The cutterbar is then unlatched but will remain seated on post 22 due to its overcenter, or overbalanced, relationship to the post. This enables the operator to move to his most advantageous position and control the cutterbar with both hands to swing it down to the operative position shown in solid lines in FIG. 1.

It will be seen from the above that the present invention utilizes existing mower structure to support the cutterbar in a stable transport position, thereby eliminating special support rods. The simple J-latch member positively prevents the cutterbar from being bounced to operative position during transport. The latch is easy to operate and has no removable parts to get lost.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claim.

Having thus described my invention, what I claim is:

In a mowing implement, the combination of a frame movable forwardly over the ground, a drag bar having one end pivotally connected to said frame and the other end disposed laterally to one side of said frame, an upstanding member carried by said drag bar between the ends thereof and extending upwardly therefrom, said upstanding member having a top surface inclined downwardly and outwardly toward said other end of said drag bar, means connected to said upstanding member for raising and lowering said drag bar relative to said frame about the pivotally connected end of the drag bar, an elongated cutterbar carried by said other end of said drag bar, means pivotally connecting said cutterbar to said drag bar for vertical swinging movement relative to the drag bar between an operative position wherein said cutterbar extends generally horizontally outwardly from said other end of said drag bar and a transport position wherein said cutterbar is inclined upwardly and outwardly toward said other end of said bar and rests against said downwardly and outwardly inclined top surface of said upstanding member, said upstanding member having an aperture therethrough adjacent said downwardly and outwardly inclined top surface, a latch member comprising a J-shaped member having a long arm, a shorter arm, and an interconnecting bight portion, said long arm of said J-shaped member extending through said aperture with a portion of said arm projecting from one side of said upstanding member while said bight portion is disposed on the other side of the upstanding member, the shortest distance between said long and shorter arms being at least as great as the thickness of said cutterbar plus the shortest distance between said aperture and said downwardly and outwardly inclined surface of said upstanding member, a first stop member on said long arm adjacent the end of the arm, a spring carried by the projecting portion of said long arm between said one side of said upstanding member and said stop member and urging said J-shaped member in one direction toward a predetermined latching position wherein said shorter arm overlies said cutterbar when the cutterbar is in transport position to hold said cutterbar against said upstanding member, and a second stop member comprising a transverse pin carried by said long arm of said J-shaped member adjacent said bight portion and engageable with said other side of said upstanding member to prevent movement of said J-shaped member in said one direction beyond said predetermined latching position and maintain a space between said bight portion and said other side of said upstanding member to facilitate manual gripping and movement of said J-shaped member in opposition to said spring to an unlatching position wherein said shorter arm is clear of said cutterbar.

References Cited
UNITED STATES PATENTS

| | | | |
|---|---|---|---|
| 1,834,523 | 12/1931 | Koelling et al. | 56—25 |
| 2,524,083 | 10/1950 | Ronning | 56—10 |
| 3,181,288 | 5/1965 | Halls | 56—25 |
| 3,216,509 | 11/1965 | Clifford | 172—413 |

ABRAHAM G. STONE, *Primary Examiner.*

RUSSELL R. KINSEY, *Examiner.*